(12) United States Patent
Friedrich et al.

(10) Patent No.: US 7,048,105 B2
(45) Date of Patent: May 23, 2006

(54) FRICTION CLUTCH

(75) Inventors: Horst Friedrich, Aidhausen (DE);
Werner Selzam, Wipfield (DE);
Klaus-Peter Oberle, Bergrheinfeld (DE); Michael Istschenko, Schweinfurt (DE)

(73) Assignee: Sachs Race Engineering GmbH, Schweinfurt (DE)

( * ) Notice: Subject to any disclaimer, the term of this patent is extended or adjusted under 35 U.S.C. 154(b) by 0 days.

(21) Appl. No.: 10/783,446

(22) Filed: Feb. 20, 2004

(65) Prior Publication Data

US 2004/0195067 A1 Oct. 7, 2004

(30) Foreign Application Priority Data

Feb. 20, 2003 (DE) .................. 103 07 145

(51) Int. Cl.
*F16D 13/68* (2006.01)
(52) U.S. Cl. .................. 192/70.19; 192/70.27; 192/109 R
(58) Field of Classification Search ............ 192/70.16, 192/70.19, 70.2, 70.27, 89.24, 107 R, 109 R
See application file for complete search history.

(56) References Cited

U.S. PATENT DOCUMENTS

| | | | |
|---|---|---|---|
| 4,846,326 A | 7/1989 | Tilton et al. | |
| 5,743,367 A * | 4/1998 | Hofmann et al. | 192/70.2 |
| 5,809,892 A | 9/1998 | Krüger et al. | |
| 5,857,546 A * | 1/1999 | Hofmann et al. | 192/70.2 |
| RE36,363 E | 11/1999 | Tilton et al. | |
| 5,975,269 A * | 11/1999 | Kosumi et al. | 192/70.27 |
| 6,092,801 A | 7/2000 | Abbadessa et al. | |
| 6,230,865 B1 * | 5/2001 | Unsleber et al. | 192/70.2 |

FOREIGN PATENT DOCUMENTS

| | | |
|---|---|---|
| DE | 198 21 654 A1 | 2/1999 |
| DE | 198 10 981 A1 | 9/1999 |
| DE | 198 35 199 C1 | 1/2000 |
| DE | 101 54 668 A1 | 5/2003 |
| DE | 203 02 735 U1 | 5/2003 |
| GB | 2 300 679 A | 11/1996 |
| WO | WO 94/04838 | 3/1994 |

* cited by examiner

*Primary Examiner*—Richard M. Lorence
(74) *Attorney, Agent, or Firm*—Cohen, Pontani, Lieberman & Pavane (57) ABSTRACT

A friction clutch includes a housing arrangement connectable to a drive element for rotation in common about an axis of rotation, a plurality of first friction disks connected to the housing arrangement such that the first friction disks are fixed with respect to rotation and axially movable relative to the housing arrangement, a hub rotatable about the axis of rotation relative to the housing arrangement and having a plurality of radially outward-projecting connection arms, a plurality of second friction disks defining engagement opening therein being closed on radial inner sides thereof, wherein the connection arms of the hub engage the engagement openings of the second friction disks such that the second friction disks are fixed with respect to rotation and axially movable relative to the hub, and a force-exerting arrangement exerting a force for urging the first friction elements and the second friction elements into contact with each other.

11 Claims, 8 Drawing Sheets

Fig. 15 ns
FRICTION CLUTCH

BACKGROUND OF THE INVENTION

1. Field of the Invention

The present invention relates to a friction clutch having a housing arrangement connectable to a drive element for rotation in common therewith about an axis of rotation, a plurality of first friction disks connected to the housing arrangement such that the first friction disks are fixed with respect to rotation relative to the housing arrangement and axially movable relative to the housing arrangement, a plurality of second friction disks connected to a hub such that the second friction disks are fixed with respect to rotation relative to the hub and axially movable relative to the hub, wherein the hub has a plurality of radially outward-projecting rotational connection arms which engage with the second friction disks for rotation in common with the hub, and a force-exerting arrangement exerting a force for urging the first friction elements into frictional contact with the second friction elements.

2. Description of the Related Art

A friction clutch is known from German patent document DE 198 21 654 A1, in which three ring-shaped, disk-shaped friction elements are connected nonrotatably to a hub. For this purpose, the hub has radially outward-projecting rotational connection arms, which thus give the hub an essentially star-like configuration. The friction elements connected to this hub have corresponding, inward-projecting rotational connection arms, so that in this way they can be connected to the hub in a way which does not allow relative rotational movement but which does allow movement in the axial direction.

A friction clutch is known from US Reissue Application RE 36,363, in which the hub also has a plurality of radially oriented rotational connection areas or rotational connection arms proceeding from a radially inner, ring-like area for the friction disks to be connected to it. The axial dimension of the rotational connection arms corresponds to the radial dimension of the ring-like area of the hub situated radially inside them. In the areas between directly adjacent rotational connection arms, walls are provided to bridge the gaps in the circumferential direction. These walls are much thinner in the axial direction than the rotational connection arms and are approximately centered relative to the axial direction with respect to the rotational connection arms. These walls are located between two friction disks to be connected nonrotatably to the hub and extend radially outward to the exact same extent as the rotational connecting arms and retain the hub axially with respect to the friction disks.

German Patent Document DE 198 10 981 A1 discloses a friction clutch, i.e., a hub for such a clutch, in which the axial fixation of the hub with respect to the friction disks to be connected nonrotatably to it is also accomplished in the radial area of the rotational connection arms. For this purpose, it is possible, for example, to provide a circumferential web or a circumferential wall on one axial side of these rotational connection arms and to provide a securing disk on the other axial side.

In the new drive systems being developed for use especially in racing vehicles, but also to an increasing extent in ordinary vehicles, the torques which must be transmitted are continually increasing. These torques must be transmitted via the friction clutches, thereby subjecting the friction clutches to very high loads. This leads to stability problems, especially in the area where various components are connected to each other for the transmission of torque.

SUMMARY OF THE INVENTION

The object of the present invention is to provide a friction clutch of the type described above such that it is suitable for the transmission of higher torques.

This task is accomplished according to the invention by a friction clutch having a housing arrangement connectable to a drive element for rotation in common therewith about an axis of rotation, a plurality of first friction disks connected to the housing arrangement such that the first friction disks are fixed with respect to rotation relative to the housing arrangement and axially movable relative to the housing arrangement, a hub rotatable about the axis of rotation relative to the housing arrangement and having plurality of radially outward-projecting connection arms, a plurality of second friction disks connected to the hub such that the second friction disks are fixed with respect to rotation relative to the hub and axially movable relative to the hub, wherein the plurality of radially outward-projecting rotational connection arms engage the second friction disks for rotation in common with the hub, and a force-exerting arrangement exerting a force for urging the first friction elements and the second friction elements into frictional contact with each other.

According to the invention, at least one of the second friction disks has engagement openings engaging the rotational connection projections on the rotational connection arms of the hub, wherein radially inner ends of the engagement openings are closed off.

The area of the connection between the second friction disk and the hub is especially critical, because this connection is established on a diameter which is smaller than that on which the first friction disks are connected to the housing arrangement. There is thus always less room available in this radially inward area to accommodate the connection, and therefore there will always be very high loads on the components here. According to the present invention, however, at least one of the second friction disks has openings in certain areas for establishing the rotational connection and does not have an essentially arm-like or star-like configuration radially on the inside. As a result, this part of the disk is very strong. There is thus no danger that excessive torsional load could cause this friction disk to become undesirably deformed.

In the friction clutch according to the invention, it is preferable for at least one of the second friction disks to have engagement openings which are closed off at the radially inner ends. The rotational connection projections on the rotational connection arms of the hub engage in these openings.

So that the minimum of one second friction disk and the rotational connection arms interact with each other across the largest possible surface area, the engagement openings may be designed to extend essentially in the radial direction. Thus the engagement openings conform to the shape of the rotational connection arms.

The engagement openings may be limited radially on the inside by a ring-shaped area of the second friction disk, as a result of which the inner area of this second friction has a very sturdy configuration.

So that a reinforced arrangement better suited to the handling of high torques is also provided in the area of the individual rotational connection arms, connecting areas may be formed between the rotational connection arms arranged around the circumference of the hub to connect these arms to each other.

The present invention also relates to a clutch disk arrangement for a friction clutch comprising a hub with a plurality of rotational connection arms extending essentially in the radially outward direction with respect to an axis of rotation and a plurality of friction disks connected such that the friction disks are fixed with respect to rotation relative to the hub and axially movable relative to the hub.

It is then also provided that at least one friction disk has engagement openings which are closed off at the radially inner ends, and that the rotational connection projections on the rotational connection arms of the hub engage in these openings.

It is obvious that a clutch disk arrangement of this type may have various groups of the features explained in detail above in the area of the hub or in the area of the second friction disks.

Another problem of the previously discussed state of the art is that the axial support or axial retention of the hub with respect to the friction disks which are fixed to the hub with respect to rotation is provided by parts or sections of the hub which are formed either radially outside on the rotational connection arms or which extend along the radial area of the rotational connection arms. These embodiments require a considerable amount of fabrication work, because these types of formations as known, for example, from German patent document DE 198 35 199 C1, are produced by the wire erosion process. In addition, because these sections adjoin the rotational connection arms radially on the outside, the axial dimension of these rotational connection arms is reduced correspondingly, which means that there is a loss of strength in the rotational connection between the hub and the friction disks to be connected to it.

The present invention therefore provides a hub for a friction clutch, where the hub has a ring-shaped body area, from which a plurality of rotational connection arms arranged around the circumference project radially outward to establish the nonrotatable connection between the hub and the friction disks. The ring-shaped body area also forms at least one axial securing area, by which the hub is secured axially with respect to the friction disks.

In the hub designed according to the present invention, there is a clear-cut radial progression according to which the rotational connection arms are situated radially outside the area which functions as axial support for the hub. This simplifies production significantly. In addition, this makes it possible for the rotational connection arms to extend farther outward in the radial direction.

For example, it is possible for the axial dimension of the area of the ring-shaped body adjacent to the rotational connection arms to be smaller than the axial dimension of the rotational connection arms. This can be realized, for example, by providing a recess in at least one axial side of the ring-shaped body adjacent to the rotational connecting arms, where the bottom area of the this recess forms the axial securing area. As a result of this set-back or recessed area in the ring-shaped body area, the friction disks which are to be connected to the hub or for at least parts of these disks may be closed radially on the inside. Accordingly, these disks do not have sections which extend radially inward in a star-like manner as known in the state of the art. This radially inner closure further increases the strength of the disk.

A connecting section which bridges the circumferential gap between the rotational connection arms may be formed between at least two of the rotational connection arms in the hub according to the present invention. The friction disks to be connected to the hub do not contact these connecting sections. The important point here is that these connecting sections, which are situated in the radial area of the rotational connection arms, provide no axial securing function. On the contrary, the connecting sections only increase the strength in the area of the rotational connection arms. For this reason, the axial dimension of the connecting sections may be smaller than that of the radial section of the ring-shaped body area which forms the minimum of one axial securing area.

The radially inner area of the ring-shaped body, which adjoins the radially inner side of the radial area forming the axial securing area, may have a rotational connection area for the nonrotatable connection of the hub to a shaft. Accordingly, there is a clear progression of the three different radial areas of the hub. A first radial area is the radially innermost area which connects the hub to a shaft. This radially innermost area is followed by a second radial area which axially supports the hub with respect to the friction disks. The second radial area is followed by a third radial area which connects the hub to the friction disks for rotation in common with them. These three areas are clearly separate from each other in the radial direction and have essentially no mutual overlap in the radial direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
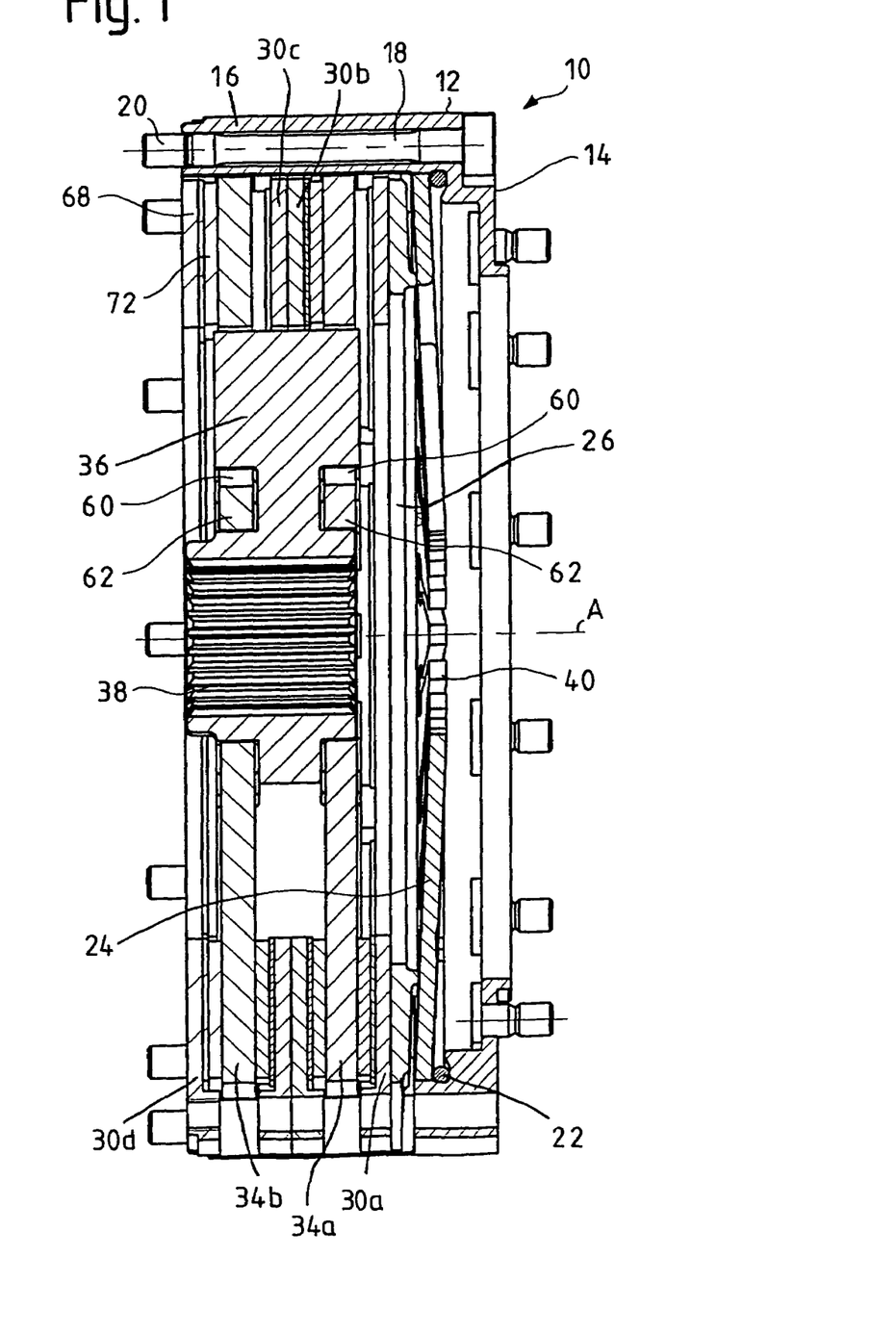
FIG. 1 is a longitudinal cross-sectional view of a friction clutch according to the present invention.
Figure 2:
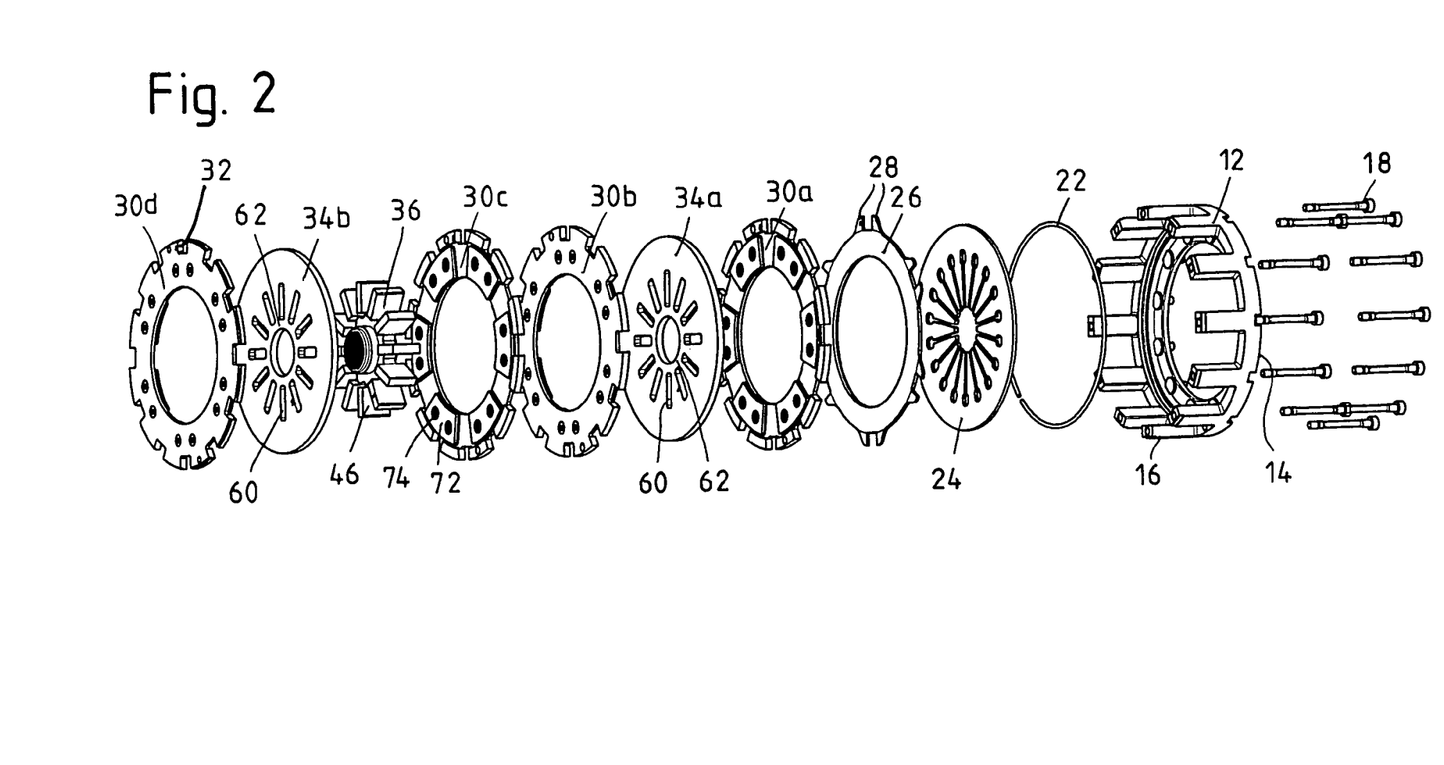
FIG. 2 is an exploded view of the friction clutch in FIG. 1.

FIGS. 1 and 2 show a friction clutch 10 according to the invention, i.e., a pressure plate assembly for such a clutch, in its entirety. The friction clutch 10 comprises a housing arrangement 12 with an essentially ring-shaped housing bottom 14 on one axial side and several web sections 16 distributed around the circumference proceeding from the housing bottom 14 in the axial direction, relative to an axis of rotation A. Screw bolts 18 pass through axial openings in these web sections 16 and have end sections 20 which project beyond these free ends of the web sections 16 so that the bolts may be threadably inserted into a flywheel (not shown), which is connectable rigidly to a drive shaft.

The radially outer area of an energy-storage device 24, designed as, for example, a diaphragm spring, is supported on the housing bottom 14 by a wire ring 22. The energy-storage device 24 acts on a pressure plate 26 at an area radially inward of the wire ring 22. The pressure plate 26 has pairs of driver projections 28 on its outer circumference which cooperate with several of the web sections 16. Each of the web sections 16 is designed to fit between the two driver projections 28 of each pair. The pressure plate 26 is thus connected to the housing 12 for rotation in common around the axis of rotation A, but is still able to move axially under the action of the energy-storage device 24 relative to the housing 12.

Four first friction disks 30a, 30b, 30c, 30d are connected nonrotatably to the housing 12, but are axially movable relative to the housing 12. For this purpose, as will be described later in detail, the outer circumferences of the first friction disks 30a, 30b, 30c, 30d have recesses 32 for accepting a web section 16. The arrangement of the first friction disks 30a, 30b, 30c, 30d is such that first friction disk 30a positioned closest to the bottom area 14 is acted upon by the pressure plate 26, whereas first friction disk 30d, which is farthest away from the bottom area 14, is supported axially against the flywheel (not shown) which is rigidly connected to the housing 12. The backs of the two intermediate first friction disks 30b, 30c rest against each other. A second friction disk 34a is arranged between first friction disks 30a and 30b and another second friction disk 34b is arranged between the first friction disks 30c and 30d. The two second friction disks 34a and 34b are essentially free to rotate with respect to the housing 12 and the first friction disks 30a, 30b 30c, 30d, but are connected to a hub 36 such that the second friction disks 34a and 34b are fixed with respect to rotation relative to the hub 36 and are axially movable relative to the hub. The hub 36 has a set of internal wedge-shaped teeth 38, so that the hub can be connected nonrotatably to a transmission input shaft or the like and such that the hub 36 can shift in the axial direction. In the engaged state, energy storage device 24 applies a force to the pressure plate 26 which acts on the first friction disk 30a. The first friction disk 30a in turn presses against the second friction disk 34a. This second friction disk 34a is supported axially against the first friction disk 30b, which in turn is supported axially against the first friction disk 30c without the possibility of any frictional action in the circumferential direction. In the engaged state of the clutch, the second friction disk 34b is then clamped frictionally between the first friction disk 30c and the other first friction disk 30d, the support in this case being provided by the contact between first friction disk 30d and the flywheel (not shown). Thus torque can be transmitted between the housing 12 and the hub 36. To release the clutch, a pulling force is exerted on the radially inner ends of the spring tongues 40 of the energy-storage device 24 to reduce or to eliminate entirely the pressure being applied by the pressure plate 26 against the first friction disk 30a and thus to reduce or to eliminate entirely the frictional interaction present between the first friction disks 30a, 30b, 30d and the second friction disks 34a, 34b.

FIGS. 3–6 show a clutch disk arrangement 42 of the friction clutch 10 in FIG. 1, wherein the clutch disk arrangement 42 consists essentially of the hub 36 and the two second friction disks 34a, 34b. The hub 36 has an essentially ring-shaped inner body area 44 with the set of wedge-shaped teeth 38 on an inner circumferential surface thereof. The hub 36 further includes a plurality of essentially radially oriented, axially stretched-out rotational connection arms 46. The radially inner area of the rotational connection arms 46 proximate the inner body area 44 includes recesses 48, 50 in both axial sides. Projections 52, 54, which extend axially in an area radially outside these recesses 48, 50, are formed on the rotational connection arms 46. A section 56 of reduced axial dimension is thus created between the two recesses 48, 50.

FIGS. 3–6 clearly show an essential principle of the hub 36 designed according to the present invention, which can be produced out of a single piece of material. The hub 36 can be divided into three separate radial areas. The first radial area is a radially inner section 100 on the inner body area 44, which inner section extends essentially across the entire axial dimension of the hub 36 and which carries the set of wedge-shaped teeth 38 on its inner circumferential surface. The second radial area is the section 56 of the ring-like body area 44 in which the recesses 48, 50 are formed on both axial sides. The second section 56 adjoins the radial outer side of section 100. The section 56 is therefore much smaller in the axial direction than the radially inner area 100. The third elementary radial section of the hub 36 according to the invention is the radial section formed by the rotational connection arms 46. Each of these three radial sections serves an important function in the inventive hub 36. The radially inner, ring-like section 100 with the set of teeth 38 connects the hub 36 to a shaft for rotation in common. The adjoining section 56 with the two recesses 48, 50 radially outside this section 100 axially secures or retains the hub 36 with respect to the friction disks 34a, 34b previously described in reference to FIG. 3 and thus with respect to the entire friction clutch. The axial retention function of section 56 is performed by bottom areas 102, 104 of the recesses 48, 50, which bottom areas 102, 104 face essentially in the axial direction. Thus the hub 36 is prevented from wandering within the friction clutch. The radially outermost section of the hub 36, formed by the rotational connection arms 46, transmits torque between the hub 36 and the friction disks 34a, 34b, which at the same time secure the axial position of the hub 36 and possibly that of additional friction disks which could be positioned between these two friction disks 34a, 34b and also connected nonrotatably to the hub 36. The result is that the axial dimension of the area 56 between the two bottom areas 102, 104 must correspond approximately to the axial dimension of the friction disks to be positioned between the two second friction disks 34a, 34b. The friction disks to be positioned between the two second friction disks 34a, 34b may comprise both the first friction disks, which are connected nonrotatably to the housing arrangement 12, and any other second friction disks which may be positioned between them, i.e., disks connected nonrotatably to the hub 36.

It can also be concluded from the preceding description that there is essentially no overlap between the three radial sections (100, 56, 46) of the inventive hub 36. The area of the rotational connection arms 46 serves no axial support function, whereas the area of the recesses 48, 50 serves no connecting function for rotation in common. Thus each of the three areas 100, 56, 46 can be designed in the best possible way to serve its intended function.

Another advantage of the hub according to the invention is that it is very easy to manufacture from a single piece of material. For example, a ring-shaped blank can first be prepared, and then the rotational connection arms 46 can be produced by a simple milling procedure with a pin-type milling cutter or a solid cylindrical cutter. Next, material can be removed by another metal-cutting procedure such as turning on a lathe or cutting with a chisel to form the radially central area, namely, the area comprising the two recesses 48, 50. Accordingly, the hub 36 according to the present invention does not require complicated processing methods such as, for example, wire erosion.

Figure 3:
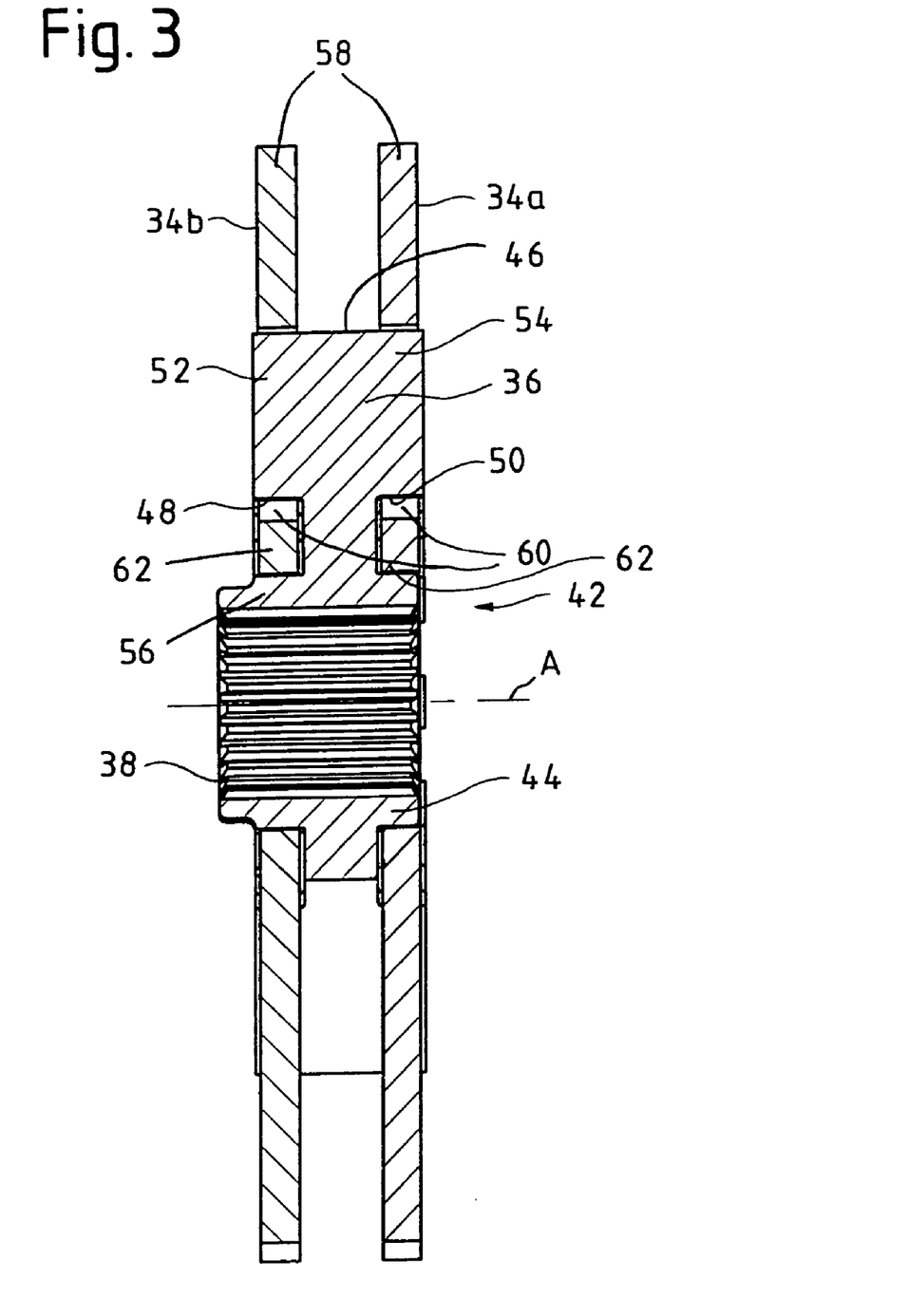
FIG. 3 is a longitudinal cross-sectional view of a clutch disk arrangement used in the friction clutch of FIG. 1.
Figure 4:
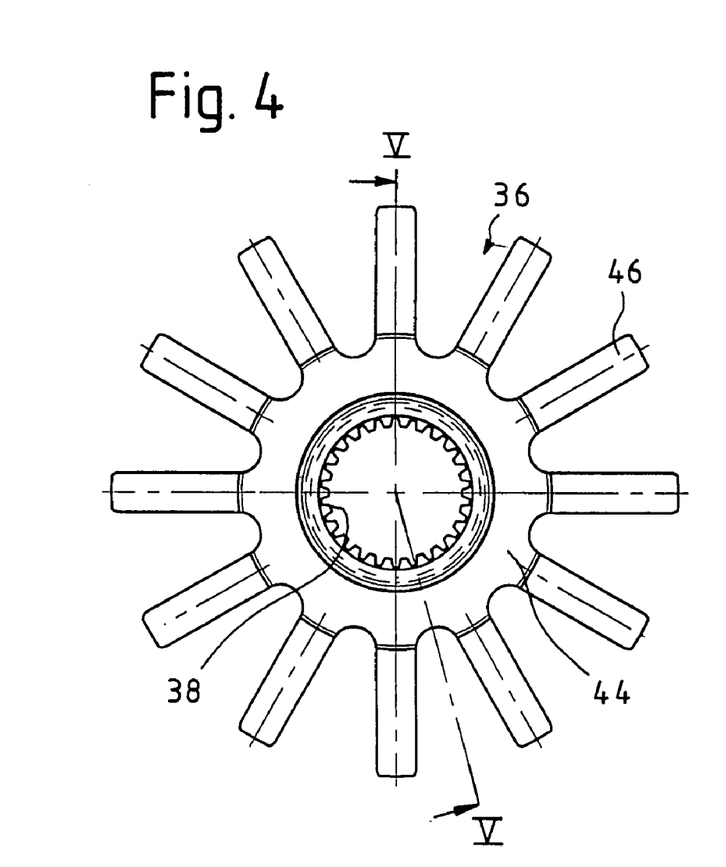
FIG. 4 is an axial view of the hub used in the clutch disk arrangement of FIG. 3.
Figure 5:
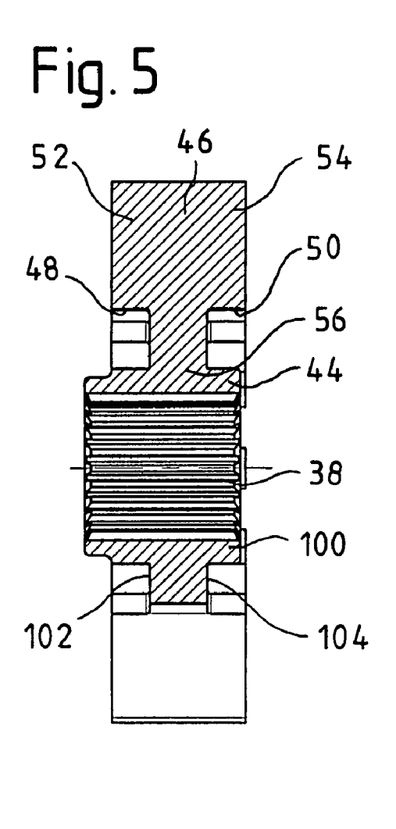
FIG. 5 is a cross-sectional view of the hub of FIG. 4 along line V—V in FIG. 4.
Figure 6:
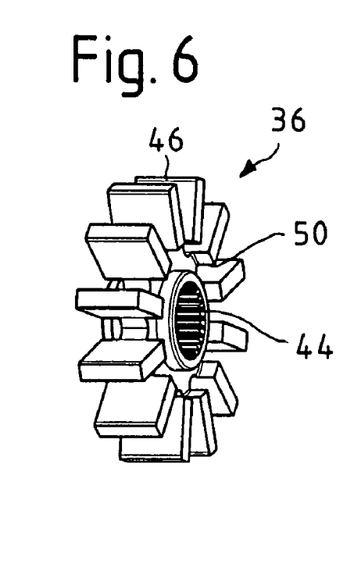
FIG. 6 is a perspective view of the hub in FIG. 4.
Figures 10, 12:
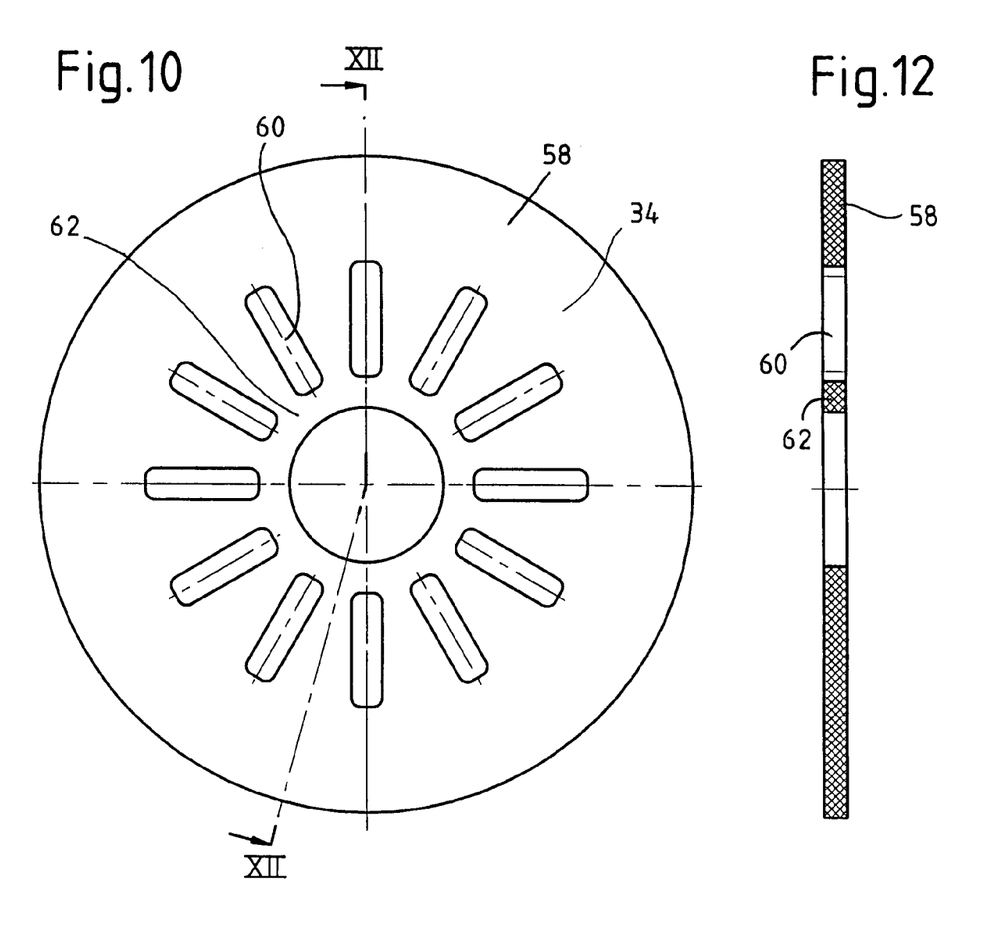
FIG. 10 is an axial view of a friction disk used in the clutch disk arrangement of FIG. 3.
FIG. 12 is a cross-sectional view of the friction disk in FIG. 10 along line XII—XII in FIG. 10.
Figure 11:
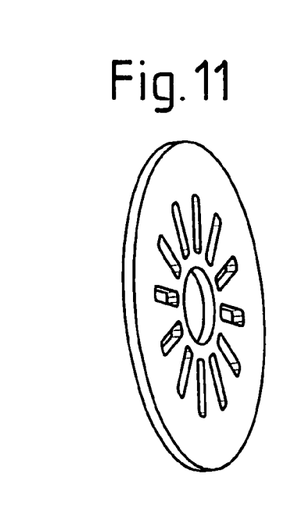
FIG. 11 is a perspective view of the friction disk in FIG. 10.

FIGS. 10–12 show a second friction disk 34, which can be used in general as the second friction disk 34a or as the second friction disk 34b, which are identical in design. The second friction disk 34 may be made of a metal such as steel, aluminum, or titanium, and has a radially outer ring-shaped area 58 by which the second friction disk 34 interacts frictionally with the first friction disks 30a, 30b, 30c, 30d assigned to it. On a radially inner side of the ring-shaped area, several essentially radial engagement openings 60 are arranged adjacent to the ring-shaped area 58. The radially inner ends of the radial engagement openings are closed off by another ring-shaped area 62. After the clutch arrangement 42 is completely assembled, the projections 52, 54 of the rotational connection arms 46 of the hub 36 engage axially in the engagement openings 60 in the two second friction disks 34a, 34b, as can be seen in FIG. 3. The shape of the engagement openings 60 is based essentially on the shape of the projections 52, 54, so that an essentially nonrotatable connection is produced between the second friction disk 34a, 34b and the hub 36. The hub 36 is secured in the axial direction by the two radially inner, ring-shaped areas 62 of the second friction disks 34a, 34b, between which the sections 56 of the rotational connection arms 46 between the recesses 48, 50 are positioned. Thus the hub 36 is prevented from migrating in either axial direction out of the area of the second friction disks 34a, 34b. It is obvious that the axial width of the area 56 must be adapted to the axial thickness of the two first friction disks 30b, 30c, so that, in the engaged state of the clutch, it is impossible for the inner ring-like areas 62 of the two second friction disks 34a, 34b to contact the area 56 before sufficient frictional contact with the first friction disks 30b, 30c has been produced externally.

The previously described design of the clutch disk arrangement 42 provides a very strong configuration. The primary reason for this is that the second friction disks 34a, 34b, which transmit torque to the hub 36, are closed radially on the inside. There is thus no danger that, during the transmission of very high torques, these two second friction disks 34a, 34b could be subjected to deformation in the area where they are connected to the hub 36. At the same time, the ring-shaped areas 62, which ensure the effective stabilization of the second friction disk 34a, 34b, also keep the hub 36 in its intended axial position.

Figure 7:
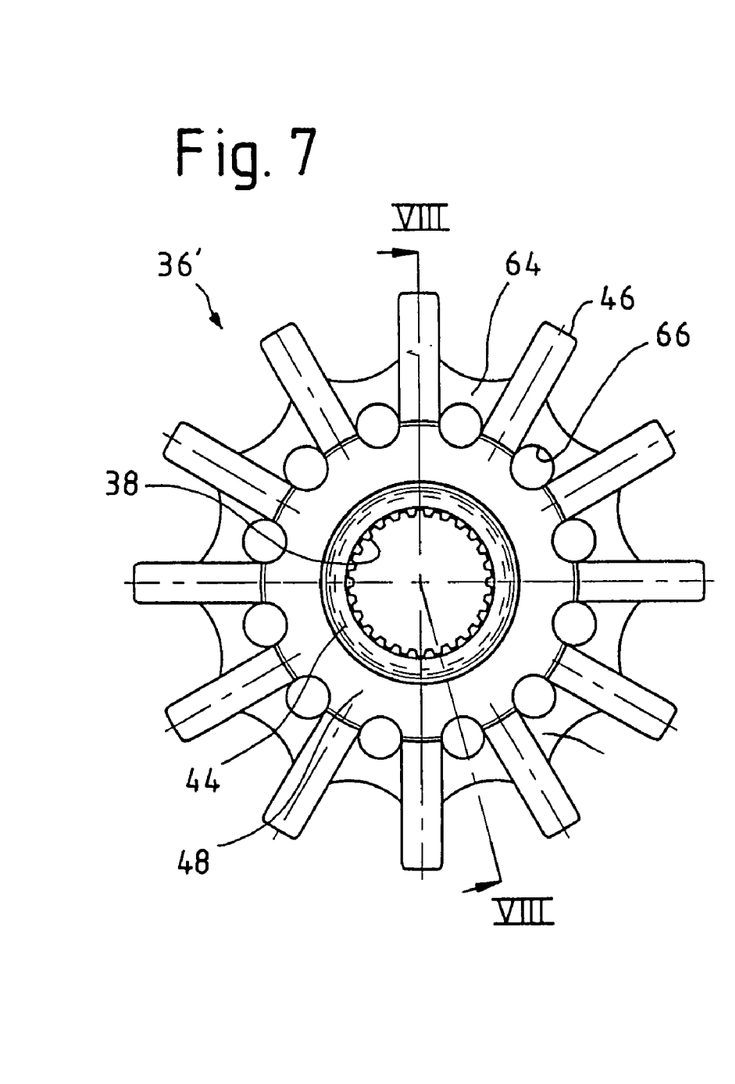
FIG. 7 is a view similar to that of FIG. 4 of a hub according to an alternative embodiment.
Figure 8:
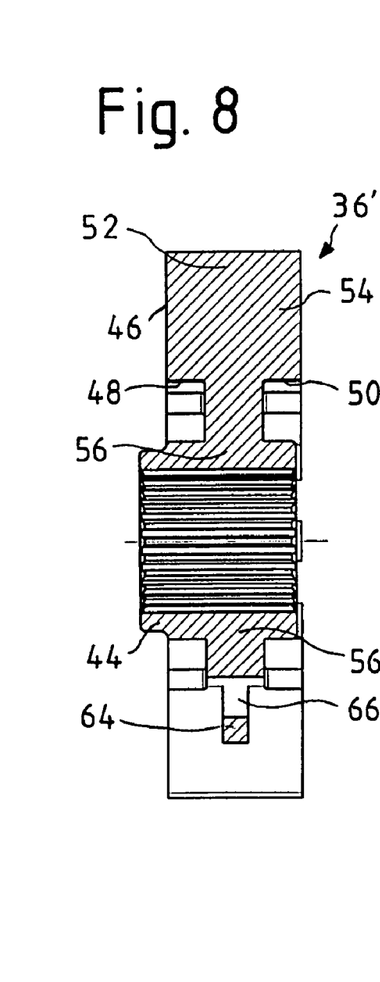
FIG. 8 is a cross-sectional view of the hub in FIG. 7 along line VIII—VIII in FIG. 7.
Figure 9:
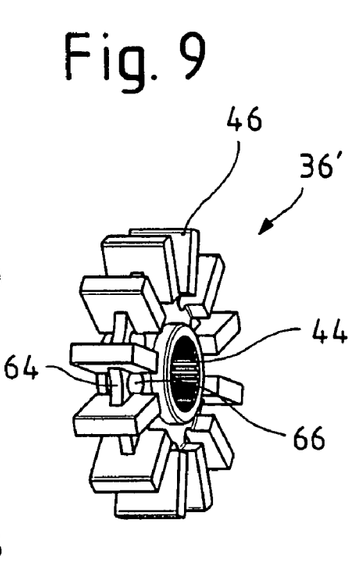
FIG. 9 is a perspective view of the hub of FIG. 7.

FIGS. 7–9 show a modified hub 36'. The basic design is the same as that described previously. However, the hub 36' also includes connecting sections 64 formed as an integral part of the hub 36' and arranged between the rotational connection arms 46 arranged around the circumference. These connecting sections 64 are located approximately in the axially center part of the arms, and extend radially outward, and also adjoin the area 56 between the two recesses 48, 50. These connecting sections extend radially approximately halfway up the center of the rotational connection arms 46 and thus reinforce the connections between the connection arms 46 in the circumferential direction. As a result, the hub 36' of FIGS. 7–9 is strengthened to handle the transmission of very high torques. To prevent an excessive increase in weight in this area as well, however, openings 66 may be provided in the area of these sections 64. These openings 66 may be formed where the connecting sections 64 adjoin the area 56 between two recesses 48, 50. The axial dimension or axial width of the connecting sections 64 is shown only by way of example in FIGS. 7–9. These connecting sections 64 may, for example, extend all the way to the radially outer end area of the rotational connection arms 46 and can obviously also have a greater axial thickness, which, in the extreme case, can even be equal to the axial thickness of the areas 56. Basically, however, in the hub according to the invention, it is important that these connecting sections 64 do not serve any axial support function for the hub 36' against the friction disks 34a, 34b connected nonrotatably to it. The axial support is the exclusive task of the radially inner area 56 adjoining the rotational connection arms 46. The connecting sections 64 have the sole function of providing circumferential stiffening between the individual rotational connection arms 46.

Figure 13:
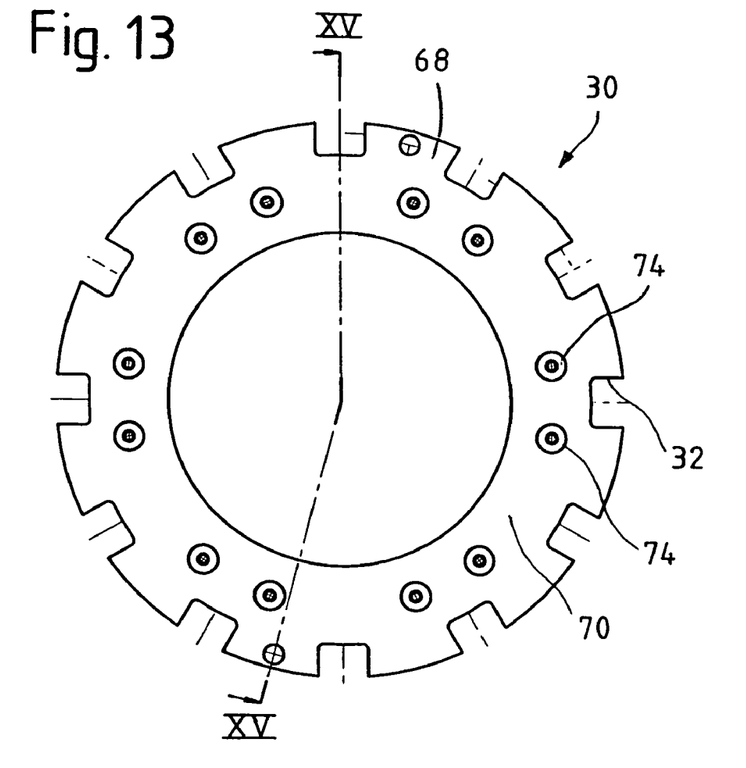
FIG. 13 is an axial view of a friction disk which is used in the friction clutch of FIG. 1 and connected nonrotatably to the housing arrangement.
Figure 14:
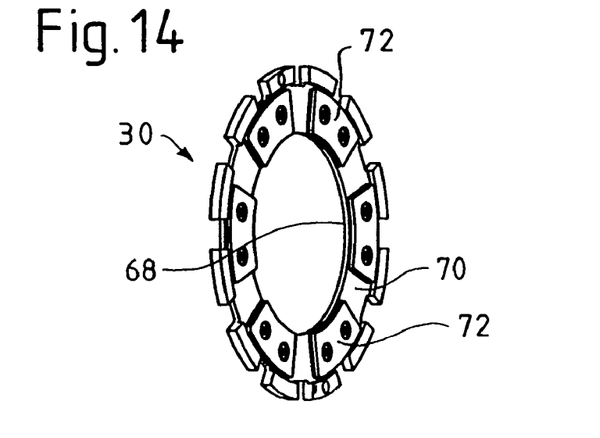
FIG. 14 is a perspective view of the friction disk of FIG. 13.
Figure 15:
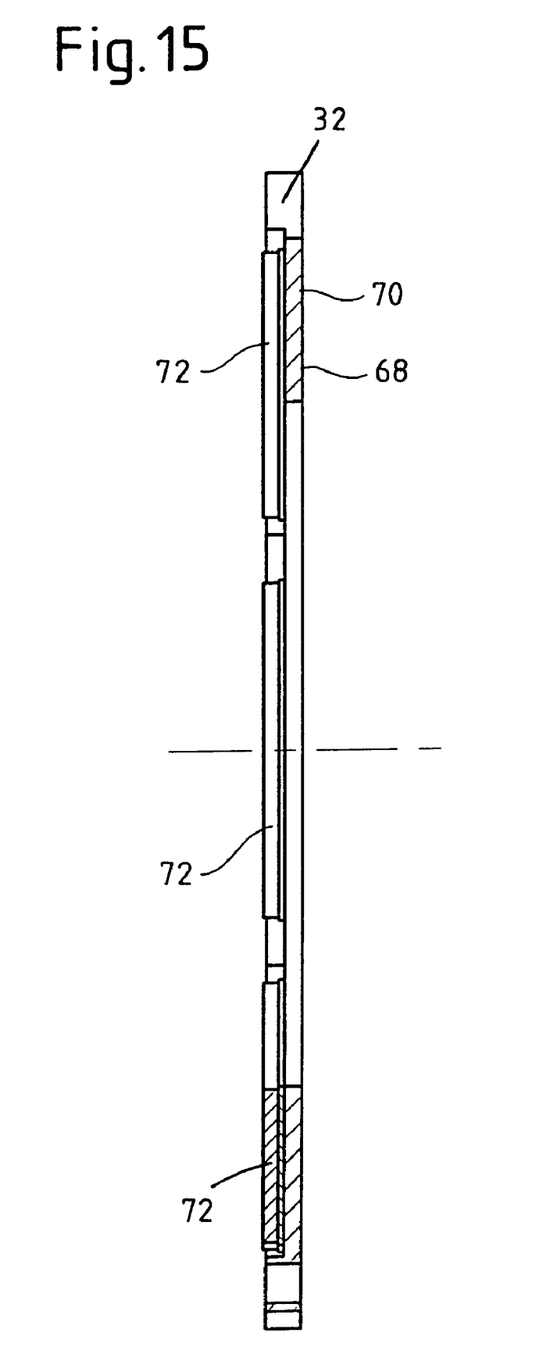
FIG. 15 is a cross-sectional view of the friction disk appearing in FIG. 13.

The design of a first friction disk 30 which can be used as one of the friction disks 30a, 30b, 30c, and 30d will be described below with reference to FIGS. 13–15. This first friction disk 30 has a ring-shaped carrier 68 made, for example, of metal in the radially outer area of which the previously mentioned recesses 32 for connection to the housing 12 for rotation in common are formed. The carrier 68, as can be seen especially clearly in FIG. 15, may have a greater axial thickness in this radially outer area. Several friction lining segments 72, arranged in succession around the circumference, are connected to a ring-shaped area 70 of the carrier 68 located further inward in the radial direction from the recesses 32. Clinch bolts 74 are the preferred means of connecting the friction lining segments 72 to the carrier, the heads of the bolts being countersunk below the surface of the segments. To ensure sufficient strength, each of the friction lining segments 72 may be connected by two of these clinch bolts 74.

The friction lining segments 72 used in this type of first friction disk 30 may be made of various materials, the selection of which depends, among other things, on the friction partner provided by the second friction disks 34. For example, carbon may be used as a friction lining material in which case the second friction disks 34 are preferably also made of carbon. Ceramic or sintered metal materials may also be considered as friction lining material, in which case the preferred friction partners will then be metal disks, such as steel, aluminum, or titanium friction disks. Organic friction materials are also possible here, in which case steel, aluminum, or titanium friction disks are again preferred as the opposing friction partners.

As a result of the design described here, an arrangement is created in which, through the provision of the friction lining segments on the first friction disks and the formation of the second friction disks of comparatively light-weight material, the mass on the engine side is increased, which makes it easier to synchronize the gearbox. Of course, the opposite arrangement is also possible, preferably when sufficient flywheel mass is present on the engine side, in which case friction lining segments are attached to the second friction disks and the first friction disks are designed as disks made of metal or carbon.

The present invention allows provision of a friction clutch or a clutch disk arrangement for such a clutch is able to handle very high torques, especially because of the way in which the second friction disks are connected to the hub for rotation in common. This is necessary or at least advantageous especially in the case of racing vehicles. To an increasing extent, however, drive systems used in ordinary vehicles are also generating very high torques. The inventive design in the area of the clutch disk arrangement is therefore especially advantageous, because the radius on which the second friction disks are connected to the hub for rotation in common is much smaller than the radius on which the first friction disks are connected to the housing for rotation in common, which means that there is usually much less room available for the elements which connect the friction disks to the hub.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. A friction clutch, comprising:
   a housing arrangement connectable to a drive element for rotation in common about an axis of rotation;
   a plurality of first friction disks connected to said housing arrangement such that said first friction disks are fixed with respect to rotation and axially movable relative to said housing arrangement;
   a hub rotatable about said axis of rotation relative to said housing arrangement and having a plurality of radially outward-projecting connection arms;
   a plurality of second friction disks defining engagement openings therein being closed on radial inner sides thereof, wherein said connection arms of said hub engage said engagement openings of said second friction disks such that said second friction disks are fixed with respect to rotation and axially movable relative to said hub; and
   a force-exerting arrangement arranged in said housing and exerting a force for urging said first friction elements and said second friction elements into contact with each other.

2. The friction clutch of claim 1, wherein each of said rotational connection arms comprises rotational connection projections extending axially on both axial sides of said each of said rotational connection arms, said rotational connection projections engaging associated ones of said engagement openings in said second friction disks.

3. The friction clutch of claim 1, wherein said engagement openings extend essentially in a radial direction.

4. The friction clutch of claim 1, wherein each of said second friction disks comprise ring-shaped areas delimiting radially inner sides of said engagement openings.

5. The friction clutch of claim 1, wherein said hub further comprises connecting areas formed circumferentially between adjacent ones of said rotational connection arms for connecting said adjacent ones of said rotational connection arms.

6. A clutch disk arrangement for a multi-disc friction clutch, comprising:
   a hub rotatable about an axis of rotation having a plurality of radially outward-projecting connection arms; and
   a plurality of friction disks defining engagement openings therein being closed on radial inner sides thereof, wherein said connection arms of said hub engage said engagement openings of said second friction disks such that said second friction disks are fixed with respect to rotation and axially movable relative to said hub.

7. A hub for a multi-disc friction clutch having a plurality of friction disks, the hub comprising:
   a ring-shaped body area rotatable about an axis of rotation; and
   a plurality of rotational connection arms arranged in succession around a circumference of said ring-shaped body area and extending radially outward, said rotational connection arms comprise axially extending projections on the axial sides thereof to establish a non-rotatable connection of said ring-shaped body area to at least some of the friction disks of the friction clutch, wherein said ring-shaped body area and radially inner ends of said rotational connection arms define recesses on both axial sides of said hub forming axial securing areas for securing said hub axially in position with respect to the at least some friction disks, and wherein radially inward facing ends of said axially extending projections define radially outer sides of said recesses, whereby said axially extending projections are arranged radially outside of said recesses.

8. The hub of claim 7, wherein a radial area of said recesses has a smaller axial dimension than radial area of said projections on the rotational connection arms.

9. The hub of claim 7, further comprising a connecting section arranged circumferentially between at least two rotational connection arms, said connecting section bridging a gap between said at least two rotational connection arms and being formed such that the friction disks connectable to the hub do not contact said connecting section.

10. The hub of claim 8, further comprising a connecting section arranged circumferentially between at least two rotational connection arms, said connecting section bridging a gap between said at least two rotational connection arms and being formed such that the friction disks connectable to the hub do not contact said connecting section, wherein said connecting section has a smaller axial dimension than an axial extent of said area of said recesses.

11. The hub of claim 7, wherein a radial area of said ring-like body area radially inside at least of one axial securing area comprises a rotational connection area for the nonrotatable connection of said hub to a shaft.

* * * * *